UNITED STATES PATENT OFFICE 2,022,979

MANUFACTURE OF DITHIOCARBAMATES

Wilhelm Rittmeister, Dessau, Germany, assignor to Deutsche Hydrierwerke Aktiengesellschaft, Berlin-Charlottenburg, Germany, a corporation of Germany No Drawing. Application September 15, 1932, Serial No. 633,312. In Germany June 11, 1932

16 Claims. (Cl. 260—43)

The present invention relates to improvements in or relating to the manufacture of dithiocarbamates.

Hitherto dithiocarbamates were prepared from carbon disulphide and amines and the vigorous reaction occurring upon the combination of the two components was moderated by the addition of a suitable solvent. In the case of water insoluble amines, water was also employed with addition of emulsifiers, as a diluent and so the one reaction component, the amine was brought to conversion in diluted form. The disadvantage of the hitherto known methods of procedure resides in the fact that it is necessary to employ additional substances not taking part in the reaction, which must be subsequently removed again by suction, filtration, distilling off and drying, which on the one hand necessitates unnecessary work and on the other hand, loss of solvent and material. Further, since the products obtained always contain or have adhering to them further residues of diluent or emulsifier they must first be purified by crystallization if especial purity is required. When water with the addition of an emulsifier is employed in the preparation the drying presents certain difficulties and leads to yellowish products generally in coarse lumps which must be ground if desired for use as a vulcanization accelerator.

It has now been found that all these disadvantages can be avoided in a very simple manner and extraordinarily pure products can be obtained if the starting materials such as carbon disulphide and amine are caused to react together in the form of vapors, gases or in state of fine sub-division, in which case inert gases serve as diluents. It is advantageous to carry out the process by separately vaporizing the carbon disulphide and amine by passing gases together in chambers or other reaction spaces. According to the vapor pressure of the particular amine and the desired degree of dilution, larger or smaller quantities of carrier gas are employed and provision is made by suitable means such as pressure regulators and flow meters for a constant gas stream. If amines are employed which are gaseous at ordinary temperatures the vaporization is unnecessary and the amine is simply mixed with the carrier gas in the necessary proportions. The vaporization of the starting materials by means of the gases employed can be effected at ordinary temperatures or in the case of higher vapor pressure at reduced temperatures or in the case of a lower vapor pressure at increased temperatures. In order to secure a constant output the vaporization is effected in baths, the temperature of which is accurately adjusted by means of known thermo regulators or relays. The method can also be carried out by bringing the starting materials, first of all into vapor form by distillation and in the case of difficultly vaporizable amines effecting very fine subdivision by means of atomizing jets, and then diluting with the gases. As carrier gas all gases can be employed which do not react with the starting materials or the reaction products, for example nitrogen, hydrogen, carbon monoxide, water gas and the like. Under certain conditions also air may be employed provided that care is taken that no ignition can take place because air forms explosive mixtures with the vapors employed. If, after the reaction, vapors of excess starting materials or impurities which under some circumstances may be valuable, are still present in the gases these can be recovered by absorption or cooling devices.

The gases can, after leaving the reaction, be conducted in a circuit through the vaporizer again and in this way there is practically no loss of carrier gas. The process can be carried out at ordinary, increased or reduced pressure. If in certain cases the reaction is too vigorous in spite of the dilution of the vapors, it can be moderated by means of cooling systems and the like.

According to the present process it is possible to prepare dithiocarbamates in various ways. As starting materials all primary and secondary amines are to be considered. The conversion can be carried out with acyclic, alicyclic and saturated heterocyclic amines. The proportions are best so chosen that 2 molecular proportions of amine are employed to 1 molecular proportion of carbon disulphide. Under some circumstances it is advantageous to work with an excess of amine or carbon disulphide.

The reaction products are mostly precipitated in the present process directly in finely pulverulent form as very pure substances which require no further crystallization. Their color mostly is brilliant white whilst the products prepared by other processes are more intensively colored. Consequently the carbamates so obtained are advantageously suited for the rubber industry particularly in cases where the production of colorless or specially colored kinds of rubber is required.

In order that the invention may be well understood the following examples will be given by way of illustration only.

*Example 1*

By passing water gas for 6 hours through a washing tower charged with piperidine, 18 kg. of piperidine are uniformly vaporized. Simultaneously water gas is passed through a washing tower charged with carbon disulphide and in the same time it takes up 7,6 kg. of carbon disulphide. The two gas streams charged respectively with piperidine and carbon disulphide are then brought together in a chamber taking about 2-4 cubic metres, in which are precipitated about 25 kg. of finely pulverulent pure white pentamethylenedithiocarbamic acid piperidine.

*Example 2*

In the same manner as described in Example 1, 19,9 kg. of cyclohexylamine and 7,6 kg. of carbon disulphide are vaporized in the course of 6 hours in streams of nitrogen and are brought together in the reaction chamber. About 27 kg. of cyclohexyldithiocarbamic acid cyclohexylamine are precipitated.

*Example 3*

12,9 kg. dibutylamine and 3,8 kg. of carbon disulphide are vaporized in separate streams of hydrogen. The vaporization of the dibutylamine takes place at 80° C. Care must be taken that the mixture of hydrogen and dibutylamine is not cooled before entry into the reaction chamber. Directly upon entry into the reaction chamber it is joined with the carbon disulphide and hydrogen mixture. Dibutyldithiocarbamic acid dibutylamine is precipitated.

*Example 4*

In the course of 5-6 hours 18,2 kg. dicyclohexylamine are atomized by means of water gas through a nozzle at a temperature of 150-250° C. into the reaction chamber. During the same period 3,8 kg. of carbon disulphide vapors are introduced by means of water gas. Dicyclohexyldithiocarbamic acid dicyclohexylamine is precipitated.

Whilst in the foregoing some specific examples of the manner of carrying out this invention have been described in detail, it is to be understood that various modifications may be made without departing from the scope of this invention.

What I claim is:

1. The process for producing dithiocarbamates from carbon disulphide and an amine of the group consisting of primary and secondary amines characterized in that the starting materials are caused to react while in a finely divided state and diluted by admixture of an inert carrier gas.

2. The process for producing dithiocarbamates from carbon disulphide and an amine of the group consisting of primary and secondary amines characterized in that the starting materials are vaporized and diluted separately with inert carrier gas and the charged gas streams are combined in a reaction chamber.

3. The process for producing dithiocarbamates from carbon disulphide and an amine of the group consisting of primary and secondary amines characterized in that the carbon disulphide is vaporized with inert carrier gas, the amine is atomized with inert carrier gas and the gas streams charged with the starting materials are combined and caused to react in a reaction chamber.

4. The process for producing dithiocarbamates characterized in that one molecular proportion of carbon disulphide is caused to react with two molecular proportions of an amine of the group consisting of primary and secondary amines both components being vaporized with inert carrier gas and reacted in a reaction chamber.

5. The process for producing dithiocarbamates characterized in that one molecular proportion of carbon disulphide is caused to react with less than two molecular proportions of an amine of the group consisting of primary and secondary amines both components being vaporized with inert carrier gas and reacted in a reaction chamber.

6. The process for producing piperidine pentamethylene dithiocarbamate characterized in that one molecular proportion of carbon disulphide is caused to react with more than two molecular proportions of piperidine both components being vaporized with inert carrier gas and reacted in a reaction chamber.

7. The process for producing dithiocarbamates from carbon disulphide and an amine of the group consisting of primary and secondary amines characterized in that the starting materials are vaporized and diluted by means of inert carrier gas, the charged gas streams are combined in the reaction chamber and the gases drawn off are used again, that portion of gas to be used for vaporizing and diluting carbon disulphide being first cleaned of amine.

8. The process for producing dithiocarbamates from carbon disulphide and an amine of the group consisting of primary and secondary amines characterized in that the reaction is caused to occur in the vapor phase.

9. The process for producing dithiocarbamates which comprises reacting carbon disulphide in a state of fine subdivision with an amine of the group consisting of the primary and secondary amines also in a state of fine sub-division.

10. The process for producing dithiocarbamates which comprises reacting carbon disulphide in a vapor phase with an amine of the group consisting of the primary and secondary amines both being in a state of fine sub-division.

11. The process for producing dithiocarbamates which comprises reacting carbon disulphide in a vapor phase and diluted with an inert gas with an amine of the group consisting of the primary and secondary amines said amine being in a state of fine sub-division.

12. The process for producing pentamethylenedithiocarbamate acid piperidine which comprises reacting vaporized piperidine with carbon disulphide in a state of fine subdivision.

13. The process for producing cyclohexyldithiocarbamic acid cyclohexylamine which comprises reacting cyclohexylamine and carbon disulphide in a vapor phase.

14. The process for producing dibutyldithiocarbamic acid dibutylamine which comprises reacting dibutylamine and carbon disulphide in a vapor phase.

15. The process for producing dithiocarbamates which comprises reacting an amine of the group consisting of the primary and secondary amines in a vapor phase with carbon disulphide in a state of fine sub-division.

16. The process for producing dithiocarbamates which comprises reacting an amine of the group consisting of the primary and secondary amines in a vapor phase and diluted with an inert gas with carbon disulphide in a state of fine sub-division.

WILHELM RITTMEISTER.